United States Patent [19]

Funahashi

[11] Patent Number: 5,368,525
[45] Date of Patent: Nov. 29, 1994

[54] RESIN FORMED PULLEY

[75] Inventor: Nobuaki Funahashi, Nakashima, Japan

[73] Assignee: Toyoda Gosei Co., Ltd., Nishikasugai, Japan

[21] Appl. No.: 153,911

[22] Filed: Nov. 17, 1993

[30] Foreign Application Priority Data

Dec. 15, 1992 [JP] Japan ................... 4-354241

[51] Int. Cl.$^5$ ............................................. F16H 55/00
[52] U.S. Cl. ................................. 474/190; 474/161
[58] Field of Search .......................... 474/190-192, 474/161

[56] References Cited

U.S. PATENT DOCUMENTS

| | | | |
|---|---|---|---|
| 4,178,811 | 12/1979 | Shepherd. | |
| 4,652,474 | 3/1987 | Kraus | 474/190 X |
| 4,722,722 | 2/1988 | Rampe | 474/161 |
| 4,946,427 | 8/1990 | Rampe | 474/161 |
| 5,308,289 | 5/1994 | Funahashi | 474/161 X |

*Primary Examiner*—Michael Powell Buiz
*Attorney, Agent, or Firm*—Cushman, Darby & Cushman

[57] ABSTRACT

A pulley formed of resin having improved strength. The pulley includes a central body formed from a synthetic resin material. The main body has a belt-retaining portion along the outer peripheral surface thereof. A boss made of a metallic cylindrical body is embedded in the axial center of the main body. The boss is adapted to be secured to a rotary shaft. A plate-shaped metallic insert extends from an outer periphery of the boss to the interior of the main body. A plurality of service holes are formed in the insert, as is at least one engaging hole. The engaging hole is filled with the same synthetic resin material as the central body is formed of.

4 Claims, 6 Drawing Sheets

5,368,525

RESIN FORMED PULLEY

This application claims priority from Japanese Patent Application No. 4-354241, filed Dec. 15, 1992, which is incorporated herein by reference.

BACKGROUND OF THE INVENTION

1. Field of the Invention

The present invention relates to a pulley, and more particularly to a resin formed pulley having improved strength.

2. Background Information

Recently, in order to decrease the weight of crank pulleys or the like, and to reduce the production costs thereof, attempts have been made to form the pulleys from a synthetic resin material.

One example of such a crank pulley is illustrated in FIGS. 1 and 2. A main body 10 consists of a circular plate made from a synthetic resin material. A flange portion 12 is formed in the outer periphery of the main body 10 for retaining a belt(not shown). A boss 14 composed of a metallic cylindrical body is embedded in an axially central portion of the main body 10. The boss 14 is adapted to be secured to a crank shaft (not shown). A plurality of metallic cylindrical inserts 16 of a smaller diameter are embedded in the main body 10 so as to penetrate its plate portion at regular intervals in the circumferential direction of the main body 10, thereby defining service holes which are used in drawing the pulley out from the crank shaft.

A plurality of projections 20 are formed in the outer peripheral surface of the boss 14 so as to project to the inside of the plate portion of the main body 10 at regular intervals in the circumferential direction of the boss 14. These projections 20 serve to improve the joining strength of the boss 14 and the main body 10.

However, when large torsional vibrations are exerted on the pulley from the crank shaft, the synthetic resin material of the main body 10 is liable to break in the portions A (FIG. 2) which contact the corners of the top end of each projection 20, and thus, sufficient strength joining the boss 14 and the main body 10 cannot be obtained.

When a torsional vibration torque of 1000 N.m is input to a pulley where the distance (R1) between the axial center of the boss 14 and the top end of each projection 20 is 22 mm, the interval(D) between two adjacent projections 20 is 4.2 mm, and the thickness (T1) of each projection 20 (FIG. 1) is 5.5 mm, the stress generated in the portion A is as large as $1968 \times 10^6$ N/m$^2$.

Furthermore, when the pulley with the above-described construction is drawn out from the crank shaft by using the service holes 18, the synthetic resin material composing the main body 10 is liable to break in the vicinity of each cylindrical metallic insert 16.

In addition, if the atmospheric temperature rises considerably, the synthetic resin material composing the main body 10 separates from the projections 20, as shown by the chain line in FIG. 3, due to the difference between the coefficient of linear thermal expansion of the synthetic resin material and of the metal composing the projections 20. Hence, looseness occurs in the vicinity of the boss 14.

SUMMARY OF THE INVENTION

It is an object of the present invention to provide a resin formed pulley with sufficient strength against external forces such as vibrations, as well as variations in the atmospheric temperature.

The resin formed pulley in accordance with the present invention includes a main body having a circular plate formed from a synthetic resin material, along the outer periphery of which a belt retaining portion is formed, a boss formed of a metallic cylindrical body, which is embedded in the central portion of the main body and is adapted to be secured to a rotary shaft, and a plate-shaped metallic insert which extends from an outer periphery of the boss to the inside of the main body of the pulley. The metallic insert has a plurality of through holes, which penetrate the main body of the pulley, and act as service holes. The metallic insert further has at least one engaging hole which is filled with the synthetic resin material composing the main body of the pulley.

In the resin formed pulley having the above-described construction, since the synthetic resin material fills the engaging holes formed in the metallic insert, the synthetic resin material contacts the wall defining each engaging hole with a sufficient contact area. Accordingly, with the resin formed pulley of the present invention, when torsional vibrations are exerted on the pulley, the stress generated between the main body and the boss can be reduced, whereby the synthetic resin material of the main body can be prevented from breaking.

Furthermore, since the through holes defining the service holes are formed in the metallic insert that is integral with the boss, upon drawing of the pulley from the crank shaft, the load applied to the wall around each through hole is distributed over the entire portion of the metallic insert, whereby stress is prevented from being concentrated into one part of the synthetic resin material composing the main body, which has been encountered with the conventional pulley, and accordingly the synthetic resin material is prevented from breaking.

In addition, with the resin formed pulley of the present invention, when the atmospheric temperature rises, the synthetic resin material filling each engaging hole expands radially outwardly, and comes into pressure contact with the outside part of the wall defining each engaging hole. When the atmospheric temperature drops, the synthetic resin material filling each engaging hole contracts radially inwardly, and comes into pressure contact with the inside part of the wall defining each engaging hole. Accordingly, in both cases, no looseness occurs between the synthetic resin material and the wall defining each engaging hole.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
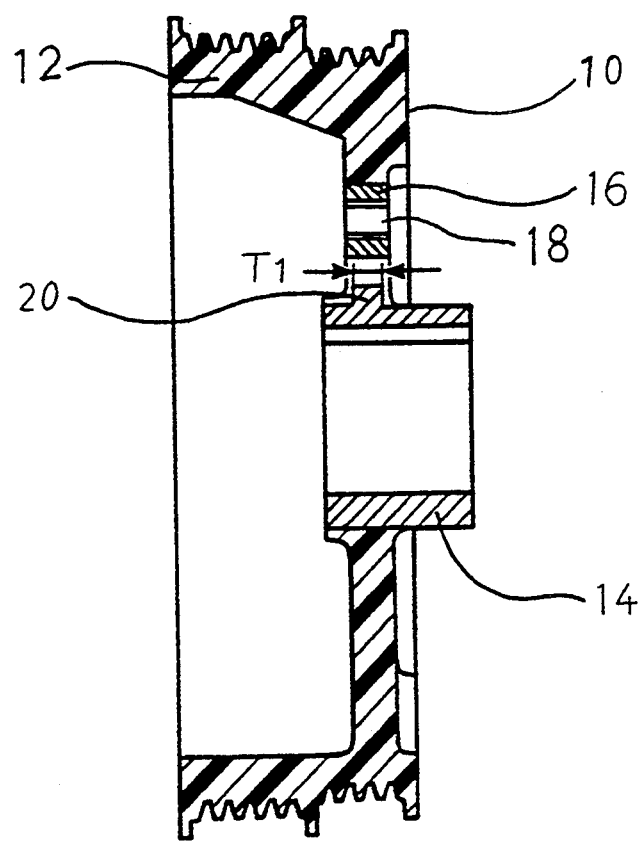
FIG. 1 is a cross-sectional view of a conventional pulley, which is taken along the line I—I of FIG. 2.
Figure 2:
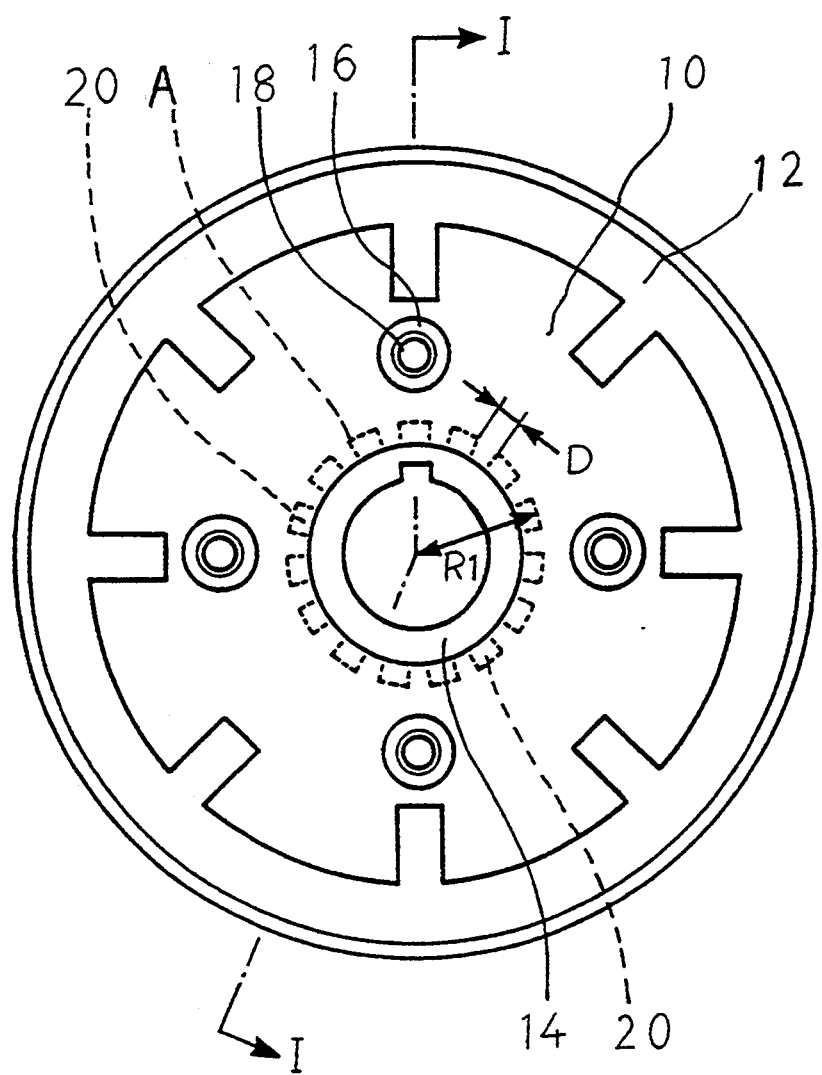
FIG. 2 is a front view of the conventional pulley.
Figure 3:
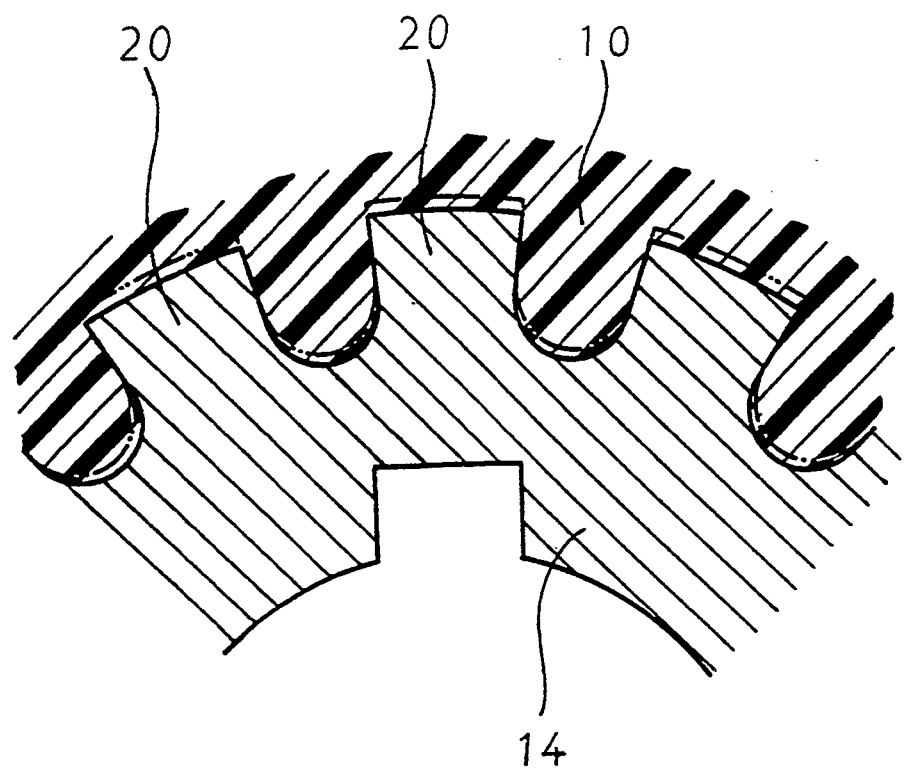
FIG. 3 is a cross-sectional view of a main portion of the conventional pulley.
Figure 4:
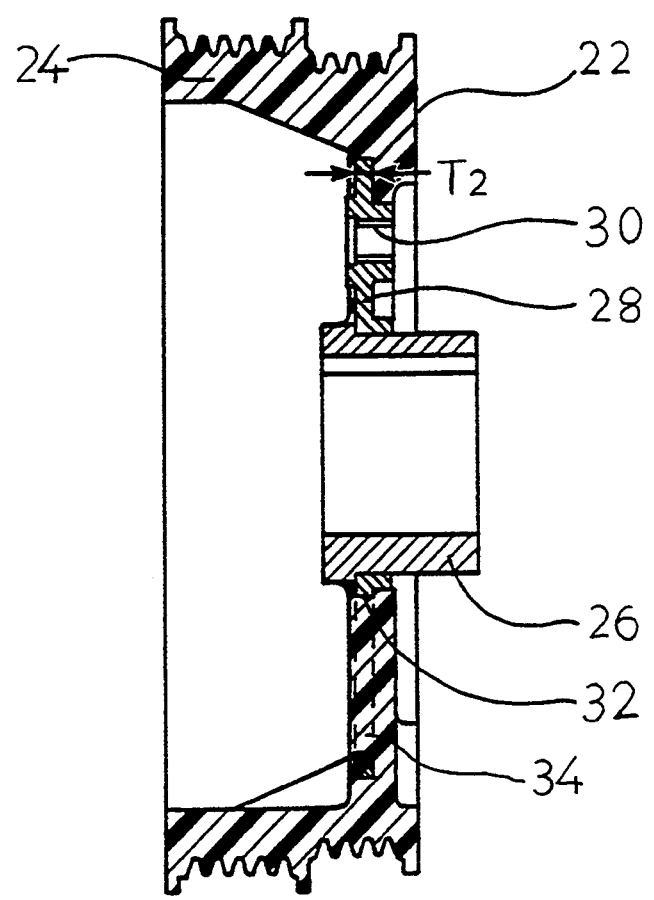
FIG. 4 is a cross-sectional view of one embodiment of a resin formed pulley according to the present invention, which is taken along the line IV—IV of FIG. 5.
Figure 5:
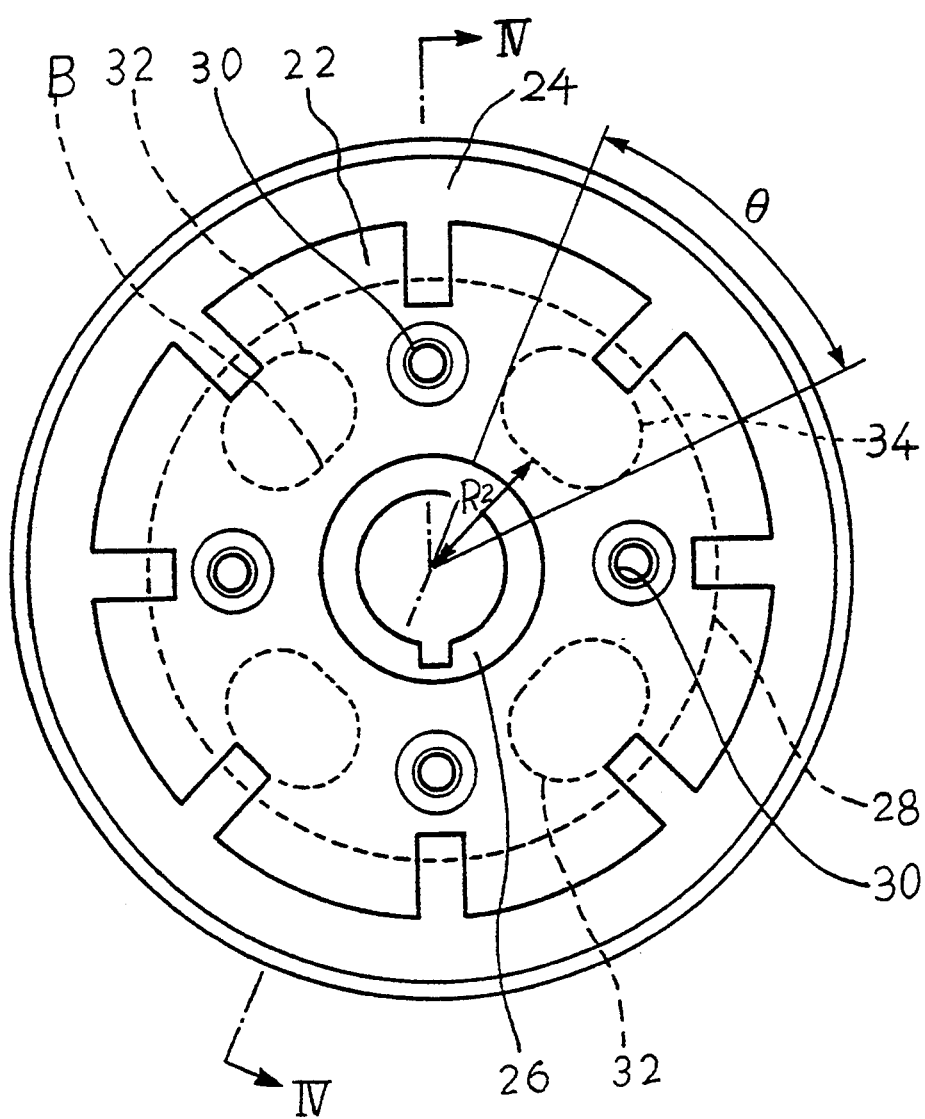
FIG. 5 is a front view of the resin formed pulley illustrated in FIG. 4.

In FIGS. 4 and 5, a main body 22 of a pulley is made of a resin formed circular plate, and is provided in its outer periphery with a flange portion 24 in which V grooves are formed for retaining a belt (not shown). A metallic cylindrical boss 26 having a keyway (not shown) is embedded in the axially central portion of the main body 22. The metallic cylindrical boss 26 is secured to a crank shaft (not shown). An annular plate-shaped metallic insert 28 is secured to the boss 26 by welding an inner peripheral surface of the insert 28 to the outer peripheral surface of the boss 26. The insert 28 extends to the inside of the main body 22.

A plurality of through holes 30 (four in this embodiment) are formed in the insert 28 so as to be regularly spaced from one another in the circumferential direction thereof. The wall defining each through hole 30 is composed of a thick cylindrical wall that is exposed to the outside of the front and rear surface of the main body 22, whereby the through holes 30 act as service holes. The insert 28 is further provided with a plurality of engaging holes 32 (two pairs, each pair being located at symmetrical positions with respect to an axial center of the boss 26, in this embodiment) so as to alternate with the through holes 30 at predetermined intervals in the circumferential direction of the insert 28.

Figure 6:
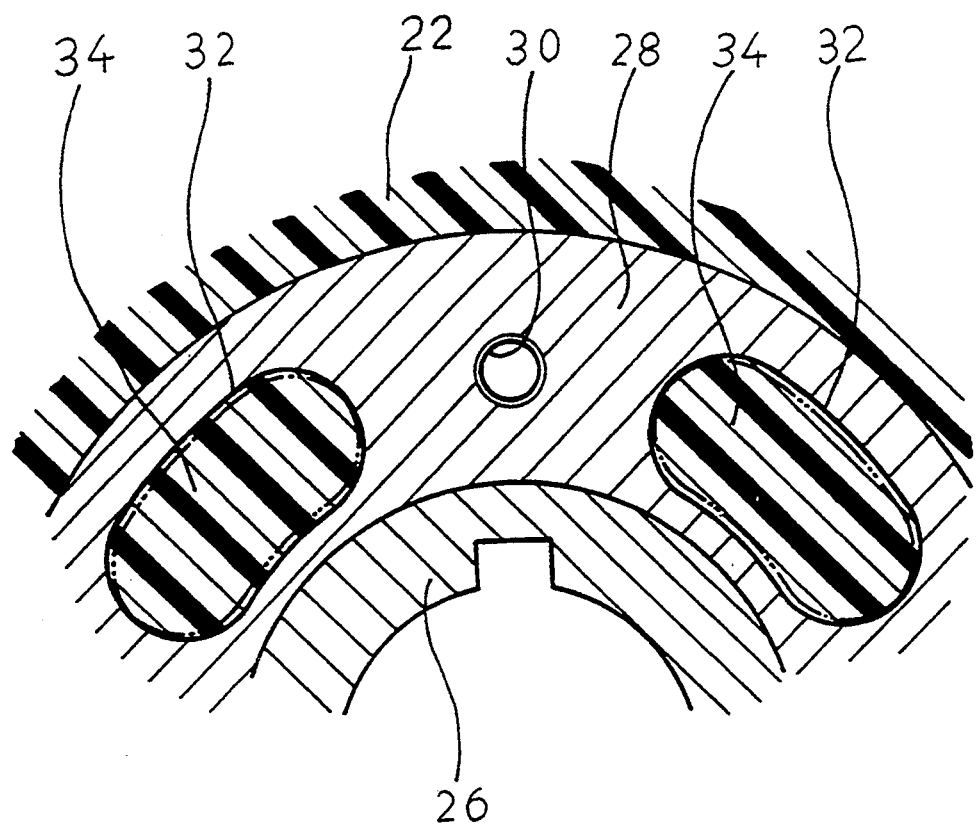
FIG. 6 is a cross-sectional view of a main portion of the resin formed pulley illustrated in FIG. 4.

Each engaging hole 32 has an elliptical shape of which the major axis extends nearly in the circumferential direction of the insert 28 over a predetermined angular range of θ. Each engaging hole 32 is filled with the resin material 34, as shown in FIG. 6, whereby the resin material 34 contacts the wall defining each engaging hole 32.

In the present embodiment, the distance (R2) between the axial center of the boss 26 and the inside part of the wall defining each engaging hole 32 is 24 mm, the angular distance θ over which the engaging hole 32 is formed is 40°, and the thickness (T2) of the insert 28 is 3 mm.

With the resin formed pulley having the above-described structure, the synthetic resin material 34 contacts the wall defining each elliptical engaging hole 32, whereby a large contact area can be obtained therebetween.

Accordingly, when a torsional vibration torque of 1000 N.m is input from the crank shaft to the pulley, the maximum stress generated in the portion B (FIG. 5) of the wall of the insert 28, which defines each engaging hole 32, is as small as $829 \times 10^6$ N/m$^2$, which is only about 60% of the stress generated in the portion A of the conventional pulley. Therefore, damage to the wall of the synthetic resin material can be prevented.

When the resin formed pulley of the present embodiment is drawn out from the crank shaft by using the service holes 30, the generated load is distributed over the entire portions of the insert 28 without being concentrated on one portion of the synthetic resin material. Therefore, with the present embodiment, even upon exertion of loads as large as 1.7 tons, the synthetic resin material does not break, although the insert 28 is deformed. In contrast, with the conventional pulley, the synthetic resin material around each service hole 18 breaks only by the exertion of loads as small as 1.2 tons.

Furthermore, in the present embodiment, when the atmospheric temperature rises, the synthetic resin material 34 expands radially outwardly of the main body 22, and loosens in the portion along the inside part of the wall defining each engaging hole 32, as shown by the inside chain line in FIG. 6. On the other hand, the portion of the resin material 34 along the outside part of the wall defining each engaging hole 32 comes into pressure contact therewith. As a result, looseness between the insert 28 and the main body 22 can be prevented.

When the atmospheric temperature drops, the resin material 34 contracts radially inwardly of the main body 22, and loosens in the portion along the outside part of the wall defining each engaging hole 32, as shown by the outside chain line of FIG. 6. On the other hand, the portion of the resin material 34 along the inside part of the wall defining each engaging hole 32 comes into pressure contact therewith. As a result, looseness between the insert 28 and the main body 22 can be prevented.

With the present invention, the number of the engaging holes is not limited to that disclosed in the above-described embodiment, but it is helpful for the engaging holes to be disposed at symmetrical positions with respect to the axial center of the pulley, as depicted in FIG. 5 and described in relation to the embodiment described above, so as to balance the forces applied to the various points of the pulley. In such a case, at least one pair of symmetrical engaging holes will achieve sufficient operational advantages.

Furthermore, the engaging holes need not necessarily be formed into an elliptical shape although the elliptical shape is preferable because by extending the engaging hole in the circumferential direction of the pulley, the contact area between the resin material and the wall defining each engaging hole is increased. Thus, when the torsional vibrations are input, the stress generated in the contact surfaces between the synthetic resin material and the engaging holes can be decreased.

As described above, the resin formed pulley of the present invention exhibits strength against torsional vibrations or use of the service holes. The strength of the resin formed pulley is prevented from decreasing due to variations in the atmospheric temperature.

While the invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A resin formed pulley comprising:
   a main body composed of a circular plate formed from a synthetic resin material, said main body being provided with a belt retaining portion in an outer periphery thereof;
   a boss composed of a metallic cylindrical body embedded in an axial center of said main body, said boss adapted to be secured to a rotary shaft; and
   a plate-shaped metallic insert which extends from an outer periphery of said boss to the inside of said main body
   said metallic insert including a plurality of services holes, said service holes penetrating said main body, and at least one engaging hole, said engaging hole being filled with said synthetic resin material.

2. The resin formed pulley according to claim 1, wherein said plate-shaped metallic insert has an annular, plate shape and has a plurality of engaging holes, said service holes and said engaging holes being alternately formed at predetermined intervals in a circumferential direction of said metallic insert.

3. The resin formed pulley according to claim 2, wherein each of said engaging holes has an elliptical shape whose major axis extends in said circumferential direction.

4. The resin formed pulley according to claim 2, wherein said engaging holes include at least two engaging holes formed at symmetrical positions with respect to an axial center of said metallic insert.

* * * * *